United States Patent [19]
Ramsey, Jr.

[11] 3,943,278
[45] Mar. 9, 1976

[54] SURFACE DEFORMATION GAUGING SYSTEM BY MOIRE INTERFEROMETRY

[75] Inventor: Stevens David Ramsey, Jr., Palo Alto, Calif.

[73] Assignee: Stanford Research Institute, Menlo Park, Calif.

[22] Filed: Aug. 22, 1974

[21] Appl. No.: 499,486

[52] U.S. Cl. ...... 178/6.8; 178/DIG. 1; 178/DIG. 36; 178/DIG. 37; 350/162 SF; 356/167
[51] Int. Cl.$^2$ ...................... H04N 7/02; H04N 7/18
[58] Field of Search. 178/DIG. 1, DIG. 36, DIG. 37, 178/6.8; 356/109, 167; 350/162 SF

[56] References Cited
UNITED STATES PATENTS

| | | | |
|---|---|---|---|
| 3,511,571 | 5/1970 | Ogle | 356/167 |
| 3,614,232 | 10/1971 | Mathisen | 350/162 SF |
| 3,634,695 | 1/1972 | Barrington | 350/162 SF |
| 3,735,036 | 5/1973 | Macovski | 178/6.8 |
| 3,768,907 | 10/1973 | Williams | 350/162 SF |
| 3,814,521 | 6/1974 | Free | 356/167 |
| 3,828,126 | 8/1974 | Ramsey | 178/DIG. 36 |

*Primary Examiner*—Howard W. Britton
*Assistant Examiner*—Michael A. Masinick
*Attorney, Agent, or Firm*—Lindenberg, Freilich, Wasserman, Rosen & Fernandez

[57] ABSTRACT

A technique for comparing master parts with replicas to determine differences in shapes or sizes, is disclosed, which uses interferometric techniques as disclosed. A television camera is used to scan the pattern established by illuminating the subject with a set of optical fringes. An objective lens images these on a transmission line grating. A television camera scans the transmission grating. The spatial frequencies of the subject fringes and of the grating are especially selected so that the camera can not resolve either of them but can resolve their difference. As a result, the output signals of the camera represent a contour map of the object placed on a low frequency spatial carrier, but yet, the measurement sensitivity is still determined by the spatial frequency of the subject fringes.

7 Claims, 1 Drawing Figure

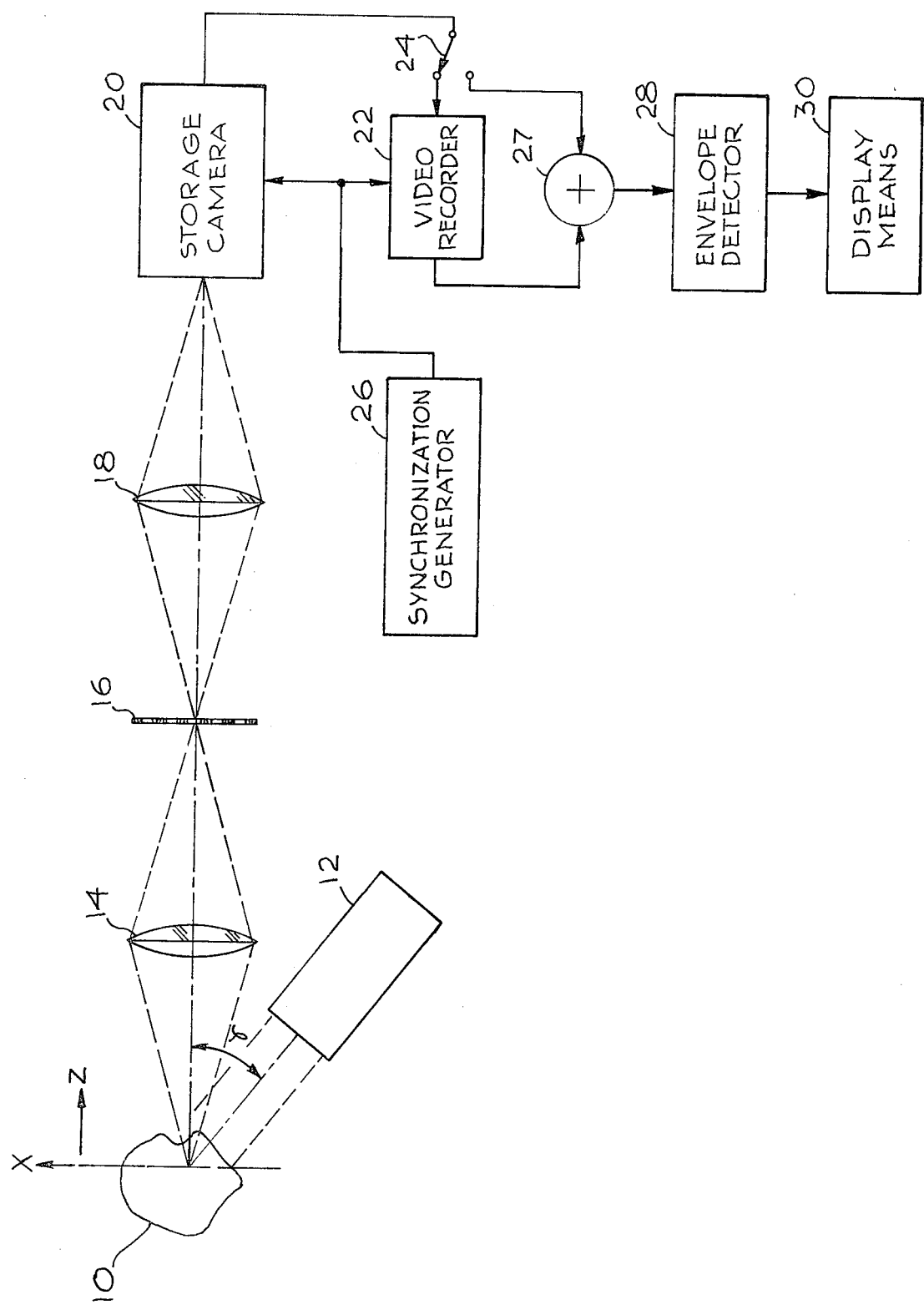

SURFACE DEFORMATION GAUGING SYSTEM BY MOIRE INTERFEROMETRY

BACKGROUND OF THE INVENTION

This invention relates to interferometry and more particularly to real time interferometry for either comparing objects or for measuring small dimensional changes therein.

The gauging of manufactured parts by Moire techniques has generally been carried out by storing the master gauge on photographic film, which requires wet photographic processing as well as repositioning accuracy of the master, comparable to the finest measurement that is being made. A television technique for doing this is shown in U.S. Pat. No. 3,649,754 and eliminates these disadvantages, but introduces a sensitivity limit of its own, due to the limited resolution of the television camera. This is enlarged upon in an article describing the television techniques and the effect of the poor spatial resolution of the transducers which are used on system performance, which article is entitled "Time-lapse Interferometry and Contouring Using Television Systems." The article is published in APPLIED OPTICS, Vol. 10, No. 12, Dec. 1971, page 2722.

OBJECTS AND SUMMARY OF THE INVENTION

It is an object of this invention to provide a system for comparing interferograms employing a television camera wherein measurement sensitivity is not limited by the resolution of the camera.

Another object of this invention is the provision of an improved system for comparing interferograms using a television camera.

Yet another object of the present invention is the provision of a novel and useful comparing system using interferogram techniques.

The foregoing and other objects of the invention are achieved in a system wherein an object is illuminated by a set of optical fringes which are then, by an objective lens, imaged onto a plane containing a transmission grating. A television camera scans the image produced by the light passing through the transmission grating. This image is stored and then compared with the image derived from a second object which is substituted in place of the first object. By determining the objective lens magnification and the spatial frequencies of the transmission grating and object fringes at values such that the television camera cannot resolve the spatial frequencies which these produce but can only resolve the difference of the spatial frequencies produced by these, the camera will produce signals which represent a contour map of the object, whose sensitivity is determined by the spatial frequency provided by the object fringes but not that of the camera itself.

The signal output of the television camera as a result of scanning the first object is stored. The stored signals are then compared with the signals produced by the television camera as it scans a second object or the same object after its surface contour has been altered, whereby differences may be displaced or otherwise suitably detected.

The novel features of the invention are set forth with particularity in the appended claims. The invention will best be understood from the following description when read in conjunction with the accompanying drawing which is a schematic diagram of an embodiment of the invention.

DESCRIPTION OF THE PREFERRED EMBODIMENT

In the drawing, an object 10 has projected thereon, by any suitable means, a grating pattern. This may be done, for example, by a projector 12 which images a grating upon the object 10. Such grating may be generated by other well known arrangements, such as for example, a coherent optical system that creates fringes by causing two coherent plane waves to intefere. In the $x$-$y$ plane the lines or fringes are in the $y$ direction and have a spatial frequency of $f_{x1}$. The object to be tested has an intensity reflectance of $a_1(x,y)$ and relief or contour information in the $z$-direction of $z(x,y)$. The fringes or grating pattern illuminate the object at an angle of $\gamma$ with respect to the $y$-$z$ plane. The sensitivity of the system is given by $\beta = f_{x1} \tan \gamma$ fringes/mm. Thus the total reflected intensity from the object is $$I_1(x,y) = a_1(x,y)\{1 + \cos 2\pi [f_{x1}x - \beta z_1(x,y)]\}. \qquad 1$$

An objective lens 14 with its optical axis colinear with the $z$-axis, images the reflected light onto a plane containing a transmission grating 16 the lines of which establish a spatial frequency $\tilde{f}_{x2}$. If the objective lens magnification is M and the grating has a constant phase angle $\phi$, then the total intensity of the light transmitted through the grating is $$\tilde{I}_1(\tilde{x},\tilde{y}) = \tilde{a}_1(\tilde{x},\tilde{y})\{1 + \cos 2\pi[\tilde{f}_{x1}\tilde{x} - \beta z_1]\} \times \{1 + \cos 2\pi[\tilde{f}_{x2}\tilde{x} + \phi]\}. \qquad 2$$

The coordinates in the plane of the grating are $\tilde{x},\tilde{y}$ so that $\tilde{x} = Mx$, $\tilde{y} = My$, $\tilde{f}x1 = f_{x1}/M$ and $\tilde{a}_1(\tilde{x},\tilde{y}) = a_1(\tilde{x}/M,\tilde{y}/M)$. Equation 2 may be expanded to give $$\tilde{I}_1 = \tilde{a}_1\{1 + \cos 2\pi[\tilde{f}_{x1}\tilde{x} - \beta z_1] + \cos 2\pi[\tilde{f}_{x2}\tilde{x} + \phi] + \tfrac{1}{2}\cos 2\pi[(\tilde{f}_{x1}+\tilde{f}_{x2})\tilde{x} - \beta z_1 +\phi] + \tfrac{1}{2} \cos 2\pi[(\tilde{f}_{x1}-\tilde{f}_{x2})\tilde{x} - \beta z_1 - \phi]\}. \qquad 3$$

A relay lens 18 images the intensity $\tilde{I}_1$ onto a television camera 20. Although a storage-type camera would normally be used for light efficiency reasons, a nonstorage type camera could also be used. Without loss of generality, it can be assumed that the relay lens images with a magnification of one so that the intensity scanned by the television tube would be $\tilde{I}_1(\tilde{x},\tilde{y})$.

The desired sensitivity $\beta$ determines the values for $f_{x1}$ and $\phi$ to some extent, but constraints are placed on them by other factors. The spatial frequency $f_{x1}$ must be resolved by the objective lens 14, but it does not have to be resolved by the television camera. The angle $\gamma$ may be restricted if it is so steep that relief on the object causes shadowing of other parts of the object.

The primary difference between this invention and previous television contouring systems is that the television camera does not have to resolve $f_{x1}/M = \tilde{f}_{x1}$ but still has a sensitivity that is determined by it. The equation 3 may be identified as a Moire pattern with the contour information present in the last two terms but placed on carriers of $(\tilde{f}_{x1} + \tilde{f}_{x2})$ and $(\tilde{f}_{x1} - \tilde{f}_{x2})$. If $\tilde{f}_{x1} = \tilde{f}_{x2}$ then the last term is an exact contour image of the object, but the other terms of the expression will cause interference. If the frequencies $\tilde{f}_{x1}$ and $\tilde{f}_{x2}$ are chosen high enough so that the camera cannot resolve either of them but can resolve $(\tilde{f}_{x1} - \tilde{f}_{x2})$ then the electrical signal out of the camera will be representative of the intensity $$\tilde{J}_1(\tilde{x},\tilde{y}) = \tilde{a}_1(\tilde{x},\tilde{y})\{1 + \frac{1}{2} \cos 2\pi[\tilde{f}_{x1} - \tilde{f}_{x2})\tilde{x} - \beta z_1 + \phi]\}. \qquad 4$$

Thus the terms containing $\tilde{f}_{x1}, \tilde{f}_{x2}$ and $(\tilde{f}_{x1} + \tilde{f}_{x2})$ have been filtered out either by the relay lens or the limited resolution of the tube, or by both. Thus the camera has only to resolve a spatial frequency $(\tilde{f}_{x1} - \tilde{f}_{x2})$ and yet has a sensitivity based on $\tilde{f}_{x1}$.

The expression 4 is just a contour map of the object but placed on a spatial carrier $(\tilde{f}_{x1} - \tilde{f}_{x2})$. If the bandwidths of $a_1(\tilde{x},\tilde{y})$ and $z_1(x,y)$ are low enough, then the contour may be obtained simply by band-pass filtering the carrier information and heterodyning it to zero frequency. However, for a gauging or interferometric applications, the signal $\tilde{J}(\tilde{x},\tilde{y})$ is stored in a video recorder 22 by operating the switch 24 to connect the camera output to the video recorder.

For a gauging measurement, the master object 10, or gauge with contour $z$, is replaced with a replica part with contour $z_2(x,y)$ which may be different than $z_1$. However, the reflectance of the replica will not be significantly different from the master so that it can be assumed that $\tilde{a}_2(\tilde{x},\tilde{y}) \doteq \tilde{a}_1(\tilde{x},\tilde{y}) = \tilde{a}(\tilde{x},\tilde{y})$. For an interferometric application, the stress on the object will be changed so that there will be a new surface contour $z_2(x,y)$. The reflectance in this case will be identical to that of $a_1$ if the change in contour is small. In either case, the second exposure can be given by $$\tilde{J}_2(\tilde{x},\tilde{y}) = a(\tilde{x},\tilde{y})\{1 + \frac{1}{2} \cos 2\pi[(\tilde{f}_{x1} - \tilde{f}_{x2})\tilde{x} - \beta z_2 + \phi]\} \qquad 5$$

Signals from a synchronization generator 26 are applied to both the camera and video recorder to cause the signal $\tilde{J}_1$ to be read out of storage in synchronism as $\tilde{J}_2$ is being scanned. Both of these signals are applied to a summer 27, the output of which is applied to a detector 28 so that the envelope of their sum is extracted. The envelope may be given by $$\text{Envelope} = \tilde{a}(\tilde{x},\tilde{y}) \sqrt{2}\{1 + \cos 2\pi \beta (z_1 - z_2)\}^{\frac{1}{2}} \qquad 6$$

which is an image of the object with a set of fringes superimposed on it indicating the difference in contours between the objects or object of the two exposures. The sensitivity of the meausrement is given by $\beta$. The envelope may be applied to a display device 30, such as a television monitor, for visual observation, or an automatic device which can count fringes or can monitor fringe density in order to reject a replica part that is out of tolerance with the master. By using other signal processing such as with limiters, only the fringe information $[1 + \cos 2\pi \beta (z_1 - z_2)]$ may be obtained.

There has accordingly been described and shown herein a novel useful and improved system for gauging surfaces by Moire interferometry using a television camera.

The embodiments of the invention in which an exclusive property or privilege is claimed are defined as follows:

1. In a system for comparing interference patterns of two objects by comparing the interference pattern signals representative of a first object derived from a television camera used for viewing said object, with the interference pattern signals representative of a second object derived from said television camera when viewing said second object the improvement comprising means for projecting a grating image on said second object, objective lens means for focusing an image of a second object on a plane in space, said objective lens means having a predetermined magnification for establishing a first spatial frequency which exceeds the resolution of said television camera, and a transmission grating means positioned in said plane in space to receive said image, said transmission grating means establishing a second spatial frequency which exceeds the resolution of said television camera.

2. In a system as recited in claim 1 wherein said first and second spatial frequencies are made substantially equal.

3. Apparatus for measuring small dimensional changes in an object by interferometry comprising means for illuminating said object with a grating image, objective lens means for focusing an image of the object illuminated with said grating image at a plane in space, said objective lens means having a predetermined magnification for producing a first spatial frequency, a transmission grating means positioned in said plane in space to receive said image and to establish a second spatial frequency, television camera means for viewing the light image produced by said transmission grating as a result of the focused image of said object falling thereon, and producing output signals representative thereof, said television camera means having a resolution less than said first and said second spatial frequencies, and means for utilizing the output of said television camera.

4. Apparatus as recited in claim 3 wherein said first and second spatial frequencies are substantially equal to one another.

5. Apparatus as recited in claim 3 wherein a lens means is positioned between said transmission grating means and said television camera means for focusing said light image produced by said transmission grating means on said television camera means.

6. Apparatus as recited in claim 3 wherein said means for utilizing the output of said television camera means includes means for storing the output signals produced by said television camera means in response to viewing the light image produced by said transmission grating means, and means for comparing the output signals stored by said means for storing with the output signals produced by said television camera means when viewing another object which replaces said first object.

7. Apparatus as recited in claim 6 wherein said means for comparing the output signals stored by said means for storing with the output signals produced by said television camera means when viewing another object which replaces said first object includes means for synchronizing the production of output signals from said television camera means with output signal production from said means for storing, means for adding the output signals from said means for storing and said television means, means for envelope detecting the output from said means for adding, and
means for displaying the output of said means for envelope detecting.

* * * * *